United States Patent
Gupta et al.

(10) Patent No.: US 9,569,577 B2
(45) Date of Patent: Feb. 14, 2017

(54) IDENTIFYING NOISE COUPLINGS IN INTEGRATED CIRCUIT

(71) Applicants: Sriram Gupta, Delhi (IN); Neeraj Jain, Ghaziabad (IN); Mohit Khajuria, Jammu (IN)

(72) Inventors: Sriram Gupta, Delhi (IN); Neeraj Jain, Ghaziabad (IN); Mohit Khajuria, Jammu (IN)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 275 days.

(21) Appl. No.: 14/515,497

(22) Filed: Oct. 15, 2014

(65) Prior Publication Data
US 2016/0110487 A1    Apr. 21, 2016

(51) Int. Cl.
*G06F 17/50* (2006.01)

(52) U.S. Cl.
CPC ....... *G06F 17/5068* (2013.01); *G06F 17/5036* (2013.01); *G06F 2217/82* (2013.01)

(58) Field of Classification Search
None
See application file for complete search history.

(56) References Cited

U.S. PATENT DOCUMENTS

| | | | |
|---|---|---|---|
| 5,668,507 A | 9/1997 | Boerstler et al. | |
| 6,564,355 B1 | 5/2003 | Smith et al. | |
| 6,668,333 B1 | 12/2003 | Demir et al. | |
| 6,941,258 B2 | 9/2005 | Van Heijningen | |
| 7,365,548 B2 | 4/2008 | Neuman | |
| 7,599,821 B1 | 10/2009 | Hou et al. | |
| 7,986,160 B2 * | 7/2011 | Hoang | G06F 17/5054 326/30 |
| 7,987,382 B2 | 7/2011 | Badaroglu | |
| 8,239,801 B2 | 8/2012 | Turner et al. | |
| 8,694,276 B2 * | 4/2014 | Sontakke | G01R 31/31724 324/750.03 |
| 8,745,568 B2 * | 6/2014 | Rivoir | G01R 31/2834 716/111 |
| 9,032,351 B2 * | 5/2015 | Asano | G06F 17/5068 716/113 |
| 2006/0223440 A1 * | 10/2006 | Stockton | H04B 1/30 455/63.1 |
| 2011/0029298 A1 | 2/2011 | Clement et al. | |

* cited by examiner

*Primary Examiner* — Leigh Garbowski
(74) *Attorney, Agent, or Firm* — Charles E. Bergere

(57) ABSTRACT

A method for determining the sensitivity of an analog output node of a mixed-signal module on a system on a chip (SoC) to noise coupling on the analog input nodes of the mixed-signal module includes (i) selecting an IP block for testing, (ii) selecting the output node, (iii) compiling a list of input nodes for testing, (iv) for each input node of the list, providing excitation signals at different frequencies, (v) for each provided excitation signal, determining the output node's noise sensitivity, and (vi) if any individual and/or cumulative noise sensitivity result exceeds a preset threshold, then modifying the SoC design to take corrective action.

19 Claims, 3 Drawing Sheets

| Excitation frequency (Hz)→ | | 1K | 10K | 100K | Noise Sensitivity (dB) 1M | 10M | 100M |
|---|---|---|---|---|---|---|---|
| IP-Level AMS Simulations | 103ai(1) | -80 | -80 | -75 | -70 | -65 | -60 |
| | 103ai(2) | -90 | -90 | -90 | -80 | -70 | -60 |
| | 103ai(3) | -100 | -100 | -95 | -90 | -85 | -85 |
| | 103ai(4) | -120 | -120 | -120 | -120 | -120 | -110 |
| SoC-Level Simulations | 103ai(1) | -80 | -90 | -80 | -75 | -75 | -70 |
| | 103ai(2) | -90 | -90 | -90 | -80 | -50 | -40 |
| | 103ai(3) | -100 | -100 | -95 | -90 | -80 | -80 |
| | 103ai(4) | -120 | -120 | -120 | -120 | -120 | -110 |
| Silicon-Validation-Level Simulations | 103ai(1) | -80 | -90 | -80 | -75 | -75 | -70 |
| | 103ai(2) | -90 | -90 | -90 | -80 | -50 | -40 |
| | 103ai(3) | -100 | -100 | -95 | -90 | -85 | -50 |
| | 103ai(4) | -120 | -120 | -120 | -120 | -120 | -110 |

IDENTIFYING NOISE COUPLINGS IN INTEGRATED CIRCUIT

BACKGROUND OF THE INVENTION

The present invention relates to integrated circuit (IC) system design and, more particularly, to identifying noise coupling among input/output (I/O) nodes of the components of the IC.

A System on a Chip (SoC) integrates, onto a single chip, several distinct functions, such as processing and memory that previously may have been implemented in distinct chips, such as a processor chip and a memory chip. A typical SoC includes a microprocessor module, a memory module, and one or more additional modules that may include, for example: timing sources such as oscillators or phase-locked-loop (PLL) circuits, interfaces, converters such as analog-to-digital (ADC) or digital-to-analog (DAC) converters, and power regulators. Some of these modules such as, for example, some PLLs and converters, use both digital and analog components and signals and are consequently referred to as mixed-signal modules. Digital components are generally clock-signal activated and include components such as logic gates and registers. Analog components are continuously active and include components such as capacitors and resistors.

Mixed-signal modules have input and/or output (I/O) nodes and may be particularly sensitive to noise coupling from the effects of switching activity by digital circuits on nearby analog circuits. Note that, as used herein, a module's I/O nodes include interfaces with any other module-external components, whether on-chip SoC components or off-chip components. A typical SoC includes a plurality of modules with densely laid out interconnections that interact in complex ways. This makes the SoC vulnerable to unintentional noise couplings and/or noise injections among the various modules' I/O nodes and lines. Reducing noise couplings would help make for more reliable SoCs.

Note that ICs may be said to comprise intellectual property (IP) blocks, which are also called IP cores. IP blocks refer to defined, designed, verified, and reusable IC building blocks. An IP block can refer to an entire module, such as, for example, a processor on an SoC, or to a portion of a module. IP blocks may be at any one of multiple levels of abstraction—similar to the way software blocks may be in pseudo code, source code, object code, executable code, or various other levels of abstraction. Correspondingly, IP blocks may be described as soft, firm, or hard. Soft IP blocks are typically in the form of netlists or hardware description language (HDL) files, and are fairly flexible in terms of physical implementation details. Hard IP blocks have predefined and detailed physical parameters for the components and are generally specific to a particular foundry. Firm IP blocks are in between hard IP and soft IP and have some predefined physical parameters, but are configurable to an extent.

It would be advantageous to be able to measure or test the mixed-signal modules of an SoC design for noise sensitivity due to cross-coupling.

BRIEF DESCRIPTION OF THE DRAWINGS

Aspects, features, and advantages of the invention will become apparent from the following detailed description, the appended claims, and the accompanying drawings in which like reference numerals identify similar or identical elements. Note that elements in the figures are not drawn to scale.

FIG. 3 is a table of exemplary noise-sensitivity values for testing the noise sensitivity of an output node of the mixed-signal module of FIG. 1 to noise on the analog input signals of the module.

DETAILED DESCRIPTION

Figure 1:
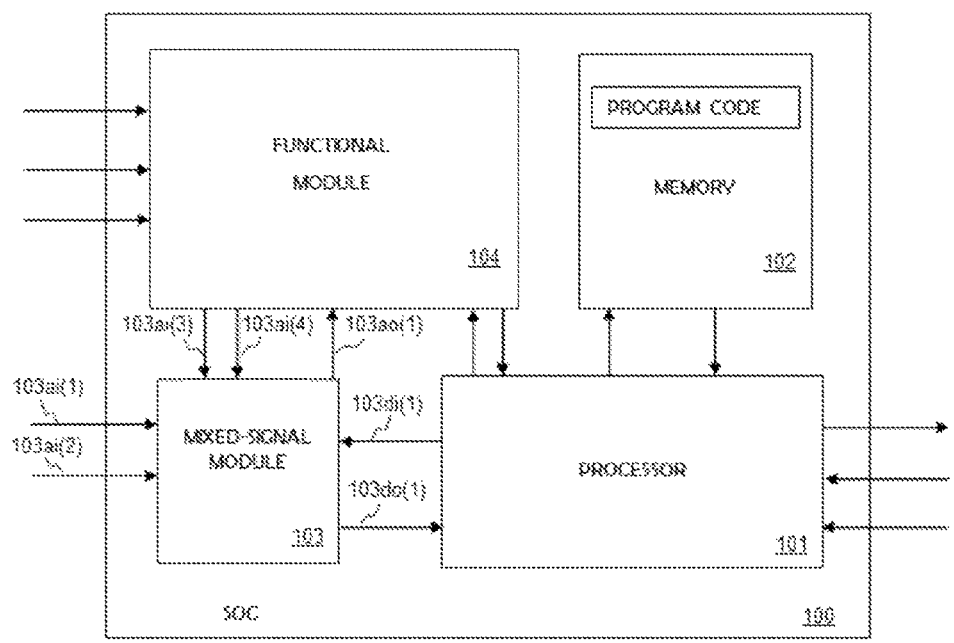
FIG. 1 is a schematic block diagram of an exemplary SoC including a mixed signal module in accordance with one embodiment of the present invention.

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative implementations, the functions/acts noted may occur out of the order noted in the figures.

A significant source of noise affecting mixed-signal modules is noise coupling from one or more internal and/or nearby digital logic circuits toggling at that circuit's clock frequency. In particular, each logic circuit's toggling may—due to unintended coupling—cause spurious variations—i.e., noise—in analog input lines of the mixed-signal modules. The cumulative effect of noise in the analog input signals may be particularly problematic for analog output nodes, whose precise levels may be significant for particular applications.

The effect that noise in a module's analog input signals has on an output signal of the module may be expressed as a sum of products. Specifically, if, for an analog input node $i$, the noise gain is $K_i$, and the noise level on the corresponding input signal is $N_i$, then the total noise $N_T$ at the output could be represented as:

$$N_T = \Sigma N_i * K_i \quad \text{(Eq. 1)}$$

Using testing, the sensitivity of the output node to noise on the input nodes may be approximated. If the total noise level is greater than some predetermined threshold level, then corrective action may be taken to reduce noise on the node or nodes that contribute the most to the total noise.

Alternatively, corrective action may be taken for any input node if the noise sensitivity of the output node to that input node is greater than some predetermined noise-sensitivity threshold. If it is determined that corrective action for an input node is necessary, then that input node and/or its corresponding signal channel may be shielded to reduce the effect of noise coupling on that input node and/or channel.

The testing may be performed in one or more stages that correspond to stages in the design and fabrication of an SoC. Depending on the stage, the testing may be through simulation or through application and measurement of physical signals using probes. Among these stages are, in decreasing order of abstraction, (i) IP-block level (ii) hardware description language (HDL) level, (iii) netlist level, and (iv) fabricated silicon stage. Simulations of noise coupling may be performed using any suitable SPICE (simulation program with integrated circuit emphasis) program such as, for example, the Spectre Circuit Simulator by Cadence Design Systems, Inc. of San Jose, Calif. or the FineSim simulator by Synopsys, Inc. of Mountain View, Calif.

Each stage of testing—whether simulation or probe-based—involves monitoring a selected output node while exciting each analog input node with a sequence of sinusoidal signals of various predetermined frequencies. In some embodiments, the plurality of signals is a sequence of 5-10 sinusoidal signals of progressively increasing frequencies that span a range of frequencies above and below the module's highest clock frequency. For each input frequency at an input node, the impact on the selected output node is recorded, and the noise sensitivity is determined, where the noise sensitivity for a particular input signal at a particular input node and a corresponding output signal is defined as:

$$\text{Noise Sensitivity} = \frac{\text{Power of Tone at Output}}{\text{Power of Excitation at Input}} \quad \text{(Eq. 2)}$$

Since the noise sensitivity represents a power ratio, it may be expressed in decibels (dB).

After each stage of testing, the results are analyzed to determine if any corrective action is necessary. If it is determined that corrective action is necessary, then corrective action to reduce the input node's sensitivity to noise coupling is taken, and the test is run again to verify the efficacy of the corrective action taken. The noise-sensitivity threshold may be varied depending on the particular module or IP block being tested. Corrective action to reduce noise coupling may include, for example, (i) shielding the input node and/or corresponding line or (ii) adding decoupling capacitors to the input node and/or corresponding line.

FIG. 1 shows a schematic block diagram of exemplary SoC 100 in accordance with one embodiment of the present invention. The SoC comprises processor 101, memory 102, mixed-signal module 103, and functional module 104. The functional module 104 may be an analog module that includes only analog IP blocks (not shown) or a mixed-signal module that also includes digital IP blocks (also not shown). Thus, for example, functional module 104 may comprise (i) a timing source—such as an oscillator or a PLL circuit, (ii) an interface, (iii) a converter—such as an ADC or DAC, and/or (iv) a power regulator. The mixed-signal module 103 may be, for example, a successive-approximation-register (SAR) ADC.

The mixed-signal module 103 communicates with other components via digital input signals $103di$, digital output signals $103do$, analog input signals $103ai$, and analog output signals $103ao$, which interface at correspondingly named nodes. Analog inputs $103ai(1)$-$(2)$ are received from external devices (not shown) outside of the SoC 100, analog inputs $103ai(3)$-$(4)$ are received from the functional module 104, and digital input $103di(1)$ is received from the processor 101. Digital output $103do(1)$ goes out to processor 101, and analog output $103ao(1)$ goes out to functional module 104.

Soc 100 may undergo noise-coupling testing at one or more of its design and production stages. In the selected stage, the testing process includes (i) selecting an IP block for testing, (ii) selecting an analog output node of the IP block for testing, (iii) defining a set of analog input nodes for testing, (iv) for each input node of the list, providing a plurality of excitation signals at different frequencies, (v) for each provided excitation signal, determining the output node's noise sensitivity based on the excitation signal and the output node's output signal, and (vi) if any individual and/or cumulative noise sensitivity result exceeds some preset threshold, then modifying the design of the SoC to take corrective action.

For noise-coupling testing during the abstract design stages, the excitation signals are simulated, while, during probe-based testing, they are physical signals generated by an external circuit and provided to the appropriate node via a probe. Note that, during the testing of a particular input node, the other analog input nodes of the IP block are provided a DC signal—such as 0V signal—and any digital input nodes of the IP block are provided clean inputs such as a static high ("1") or low ("0") signal. The output node's signal is correspondingly either provided by the simulation program or measured by a testing probe.

Figure 2:
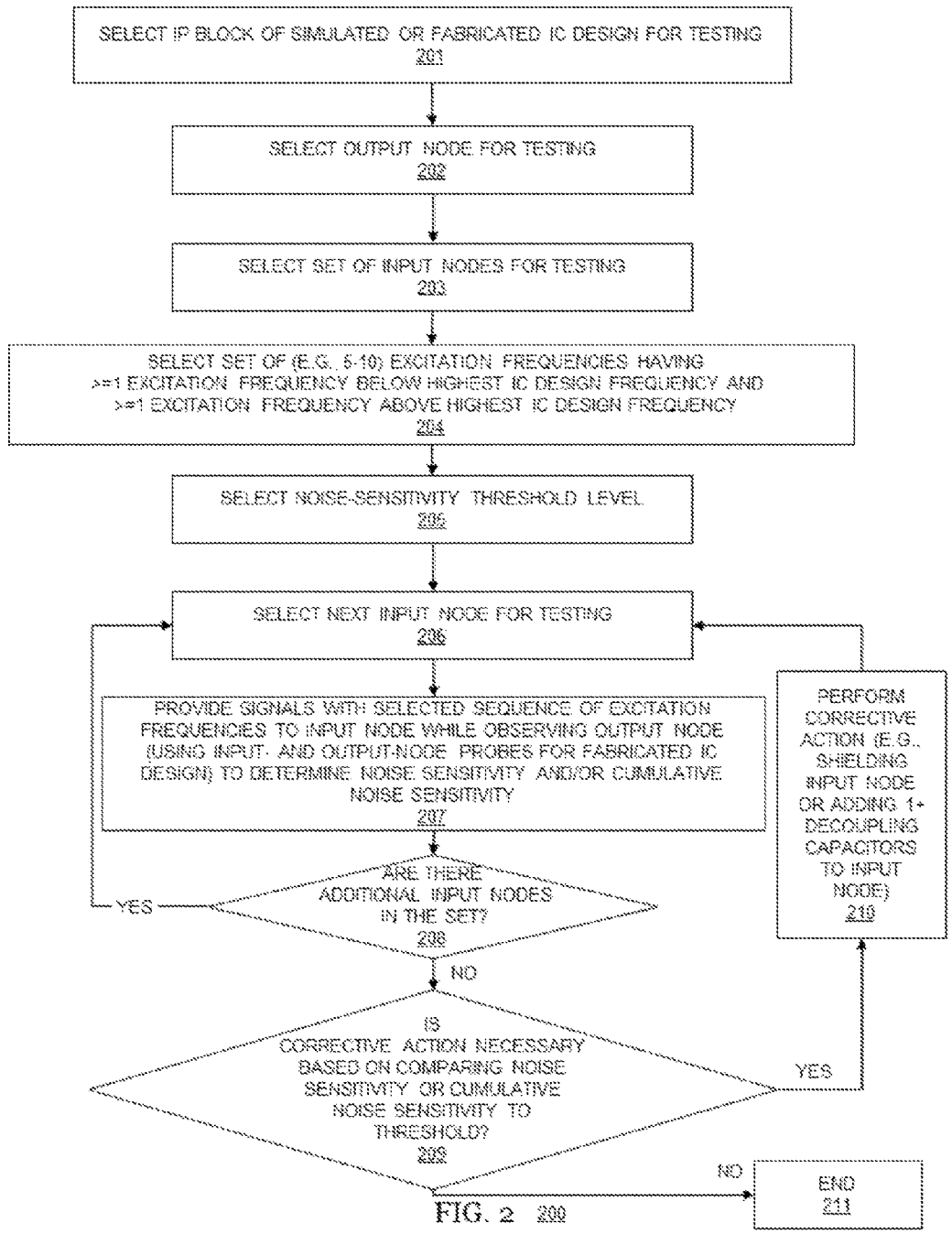
FIG. 2 is a flow chart for a process in accordance with an embodiment of the present invention.

FIG. 2 shows a flowchart for a process 200 in accordance with an embodiment of the present invention. Process 200 starts with a selection of an IP block for testing (step 201). An output node is selected for testing (step 202). A set of input nodes is established for testing (step 203). The set of input nodes may consist of, for example, (i) only the analog input nodes that connect—via analog components of the selected IP block—to the selected output node, (ii) all of the analog input nodes of the selected IP block, or (iii) all of the input nodes—analog and/or digital—of the selected IP block.

A set of excitation frequencies is determined (step 204). This set may be determined based on one or more clock frequencies used by digital components of the selected IP block. A threshold noise-sensitivity level—either cumulative or individual—is selected (step 205). This threshold level may depend on the characteristics of the selected IP block, the selected output node, and/or the selected set of input nodes.

A next input node of the set of input nodes is selected for testing (step 206). The particular sequence of testing the input nodes is not important. Test signals at each of the frequencies of the set of excitation frequencies are provided to the currently selected input node, the effect on the selected output node is observed, and the noise sensitivity for the input node and each excitation frequency is calculated and recorded (step 207). The particular order of the provision of the excitation frequencies during the testing is not important.

If there are additional input nodes to be tested (step 208), then the process 200 returns to step 206, and the next input node is selected. If there are no additional inputs nodes to be tested (step 208), then the noise sensitivity results are analyzed to determine whether any corrective action is necessary (step 209). If no corrective action is necessary (step 209), then the process 200 terminates (step 211). If corrective action is required (step 209), then the corrective action is performed (step 210), and the process 200 returns to step 206. Note that process 200 may instead return to any one of steps 201, 202, 203, 204, or 205. Note that, as noted above, process 200 may be performed during a variety of different stages in the design and development of the SoC comprising the selected IP block.

FIG. 3 shows table 300 comprising exemplary noise sensitivity values for testing of the noise sensitivity of output node 103*ao*(1) of mixed-signal module 103 of FIG. 1 to noise on the analog input signals 103*ai* of module 103. Table 300 shows exemplary results for testing at three different design levels—namely, IP-level analog/mixed-signal (AMS) simulations, SoC-level simulations, and silicon-validation-level probe-based testing. At each level, the noise sensitivity threshold level was set to −30 dB. Since none of the values shown in table 300 exceeded this threshold level, no corrective action was taken. The table 300 shows that noise sensitivity results may sometimes vary significantly between simulation and probe-based testing for the same input node and excitation frequency—as seen, for example, for input 103*ai*(3) at 100 MHz—thereby demonstrating the limitations of simulations and the importance of probe-based testing at the fabricated-silicon level.

Embodiments of the invention have been described where the mixed-signal module undergoing testing connects via its I/O nodes to one functional module that includes analog IP blocks. The invention is not, however, so limited. In some alternative embodiments of the invention, the mixed-signal module connects to two or more functional modules, while, in some other alternative embodiments, the mixed-signal module connects to no functional modules.

Embodiments of the invention have been described where the mixed-signal module undergoing testing connects via its I/O nodes to one digital module. The invention is not, however, so limited. In some alternative embodiments of the invention, the mixed-signal module connects to two or more digital modules, while, in some other alternative embodiments, the mixed-signal module connects to no digital modules.

Embodiments of the invention have been described where the noise modeling is performed on a mixed-signal module of the SoC. The invention is not, however, so limited. The modeling may be performed on IP blocks or IP cores that are not SoC modules.

Embodiments of the invention have been described where the testing is performed only on the analog inputs of the mixed-signal module. This is because the analog inputs are generally far more susceptible to noise than digital inputs. However, the invention is not so limited. In some alternative embodiments, the digital inputs of the mixed-signal module are also included in the testing and potential corrective actions.

Embodiments of the invention have been described where the sequence of sinusoidal test signals provided to an input node are provided in a sequence of progressively increasing frequencies. The invention, however, is not so limited. In some alternative embodiments, the signals are provided in a sequence of decreasing frequencies. In some other alternative embodiments, the signals are provided so that consecutive signals in the sequence may increase or decrease in frequency. In some alternative embodiments, the test signals are not purely sinusoidal in shape.

Embodiments of the invention have been described where the test signals are provided as discreet signals at predefined frequencies. The invention, however, is not so limited. In some alternative embodiments, the different excitation signals are provided as part of a continuously provided test signal whose frequency is varied. Determinations of noise sensitivity at the output node may be made (i) when the signal is at predefined frequencies, (ii) at preset time intervals, (iii) continuously, or (iv) using some other predefined algorithm.

Embodiments of the invention have been described where process steps are performed in a particular sequence. The invention, however, is not so limited. In some alternative embodiments, one or more of the steps may be performed at a different stage in the sequence. For example, in one alternative embodiment, the thresholds and testing frequencies are determined before the IP block is selected.

Embodiments of the invention have been described where the noise sensitivity results are analyzed after all of the input nodes of the selected set of input nodes have been tested at all of the selected excitation frequencies. The invention, however, is not so limited. In some alternative embodiments, if the noise sensitivity result for a particular input node at a particular input frequency exceeds the determined threshold, then the process skips further testing and jumps to the performance of corrective action. The jump may be made, for example, immediately after the particular input frequency is provided or immediately after finishing testing for the particular input node.

Embodiments of the invention have been described where input and output signals' power levels are used to calculate noise sensitivity levels and compare them to a threshold level. In some alternative embodiments, the power ratios are instead used to determine noise immunity levels. A noise immunity level is the arithmetic inverse of the corresponding noise sensitivity level. Thus, for example, if a noise sensitivity of −60 dB is determined for a particular set of parameters, then the corresponding noise immunity level would be 60 dB.

Embodiments of the invention have been described where the set of input nodes for testing is predetermined. The invention, however, is not so limited. In some alternative embodiments, the various input nodes of the set are dynamically determined during the testing.

Embodiments of the invention have been described where the set of excitation frequencies for testing is predetermined. The invention, however, is not so limited. In some alternative embodiments, the various excitation frequencies of the set are dynamically determined during the testing.

It will be further understood that various changes in the details, materials, and arrangements of the parts which have been described and illustrated in order to explain the nature of this invention may be made by those skilled in the art without departing from the scope of the invention as expressed in the following claims.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

The invention claimed is:

1. A method for testing an integrated circuit (IC) design with an electronic design automation (EDA) tool, the EDA tool including a processor coupled to a memory in which the IC design is stored, wherein the IC design includes one or more IP blocks that include one or more mixed-signal modules, the method comprising:
   (a) the EDA tool selecting an IP block for testing;
   (b) the EDA tool selecting an analog output node of the IP block for the testing;
   (c) the EDA tool selecting a set of one or more input nodes for the testing;
   (d) for each input node of the set, the EDA tool providing a plurality of excitation signals, wherein at least two excitation signals of the plurality have different frequencies; and
   (e) for each provided excitation signal, the EDA tool determining the output node's noise sensitivity by relating the provided excitation signal to a corresponding output signal at the output node, wherein:
      the one or more IP blocks of the IC design are designed to operate at one or more clock frequencies including a highest clock frequency of the IC design;
      at least a first excitation signal of the plurality of excitation signals has a frequency below the highest clock frequency of the IC design; and
      at least a second excitation signal of the plurality of excitation signals has a frequency above the highest clock frequency of the IC design.

2. The method of claim 1, further comprising:
   (f) the EDA tool selecting a noise-sensitivity threshold level; and
   (g) the EDA tool comparing the noise-sensitivity threshold level to the output node's determined noise sensitivity to determine whether the output node's determined noise sensitivity exceeds the noise-sensitivity threshold level.

3. The method of claim 2, further comprising:
   (h) the EDA tool determining whether corrective action to reduce the output node's sensitivity to noise is necessary based on the results of the comparison.

4. The method of claim 3, further comprising:
   (j) performing the corrective action if it is determined that the corrective action is necessary; and
   (k) the EDA tool then repeating steps (d), (e), (g), and (h).

5. The method of claim 3, further comprising performing the corrective action if it is determined that the corrective action is necessary, wherein the corrective action comprises at least one of: (i) shielding the corresponding input node and (ii) adding one or more decoupling capacitors to the corresponding input node.

6. The method of claim 3, wherein the EDA tool determines that the corrective action is necessary if and only if the determined noise sensitivity exceeds −30 dB.

7. The method of claim 1, further comprising:
   (f) the EDA tool selecting a noise-sensitivity threshold level;
   (g) the EDA tool determining a cumulative noise sensitivity for the output node that accumulates the output node's noise sensitivity to all of the input nodes of the set of one or more input nodes for the testing; and
   (h) the EDA tool comparing the noise-sensitivity threshold level to the output node's determined cumulative noise sensitivity to determine whether the output node's determined cumulative noise sensitivity exceeds the noise-sensitivity threshold level.

8. The method of claim 1, wherein:
the IC is a system on a chip (SoC) comprising a processor module, a memory module, and a mixed-signal module;
the mixed-signal module comprises the IP block; and
the mixed-signal module is connected to the processor module.

9. The method of claim 1, wherein:
the IC design further comprises a functional module that includes analog components; and
at least one of the set of one or more input nodes for the testing connects to the functional module.

10. The method of claim 1, wherein:
the IC design is a simulated IC design; and
the EDA tool performs steps (d) and (e) on the simulated IC design using an appropriate computer-implemented simulation program.

11. The method of claim 1, wherein:
the IC design is a fabricated IC design; and
the EDA tool performs steps (d) and (e) on the fabricated IC design using probes coupled to appropriate input and output nodes of the fabricated IC design.

12. The method of claim 1, wherein:
an initial IC design is a simulated IC design;
the EDA tool performs steps (d) and (e) on the simulated IC design using an appropriate simulation program;
a subsequent IC design is a fabricated IC design based on the simulated IC design; and
the EDA tool then repeats the method on the fabricated IC design using probes coupled to the appropriate input and output nodes of the fabricated IC design.

13. The method of claim 1, wherein the plurality of excitation signals comprises a sequence of five to ten excitation signals of increasing frequency.

14. The method of claim 1, wherein the EDA tool determines the frequencies of the excitation signals of the plurality of excitation signals prior to the EDA tool performing step (d).

15. The method of claim 1, wherein step (e) comprises:
the EDA tool measuring an output tone at the output node;
the EDA tool determining the output node's noise sensitivity for each excitation signal at each input node as a ratio of power of the output tone at the output node to power of the excitation signal at the input node.

16. The method of claim 1, wherein the set of one or more input nodes for the testing comprises all of the analog input nodes of the IP block.

17. The method of claim 1, further comprising, while the EDA tool is providing an excitation signal to an input node, the EDA tool providing corresponding DC signals to each of the other input nodes of the IP block.

18. The method of claim 1, wherein each of the excitation signals of the plurality of excitation signals is a sinusoidal signal.

19. A machine-readable medium, having encoded thereon program code, wherein, when the program code is executed by a machine, the machine implements a method for testing for noise coupling between I/O nodes, the method comprising the steps of:
(a) the machine selecting an IP block of an integrated circuit (IC) for testing;
(b) the machine selecting an output node of the IP block for the testing;
(c) the machine selecting a set of one or more input nodes for the testing;
(d) for each input node of the set, the machine providing a plurality of excitation signals, wherein at least two excitation signals of the plurality have different frequencies; and
(e) for each provided excitation signal, the machine determining the output node's noise sensitivity by relating the provided excitation signal to a corresponding output signal at the output node, wherein:
the one or more IP blocks of the IC design are designed to operate at one or more clock frequencies including a highest clock frequency of the IC design;
at least a first excitation signal of the plurality of excitation signals has a frequency below the highest clock frequency of the IC design; and
at least a second excitation signal of the plurality of excitation signals has a frequency above the highest clock frequency of the IC design.

* * * * *